United States Patent

[11] 3,608,860

| [72] | Inventor | John M. Horn<br>York, Pa. |
|---|---|---|
| [21] | Appl. No. | 875,625 |
| [22] | Filed | Nov. 12, 1969 |
| [45] | Patented | Sept. 28, 1971 |
| [73] | Assignee | Allis-Chalmers Manufacturing Company<br>Milwaukee, Wis. |

[54] WICKET-GATE-RESTRAINING DEVICE
3 Claims, 4 Drawing Figs.

[52] U.S. Cl. .................................................. 251/79,
287/52.02, 64/27
[51] Int. Cl. ............................................. F16k 31/52,
F16d 1/06, F16d 3/14
[50] Field of Search. ............................ 287/52.02,
54 E; 64/27, 28, 30; 251/79, 81, 285

[56] References Cited
UNITED STATES PATENTS
| 731,971 | 6/1903 | Swan | 287/52.02 |
| 1,306,119 | 6/1919 | Pharo | 287/52.02 |
| 1,830,976 | 11/1931 | Ashworth | 287/52.02 |
| 1,990,090 | 2/1935 | Packard | 251/81 |
| 3,060,706 | 10/1962 | Hess | 251/79 X |

*Primary Examiner*—Henry T. Klinksiek
*Attorneys*—John P. Hines, Robert B. Benson and Arthur M. Streich

ABSTRACT: A frictional connection in the linkage for controlling hydraulic turbine wicket gates. Each wicket gate is provided with a shaft to which is connected an arm which is operated to revolve the wicket gate to a desired position. A frictional connection is provided between the arm and the wicket gate shaft so that if a predetermined torque is exceeded, slippage will take place between the shaft and the arm prior to damaging the gate or linkage. Because of the frictional connection, after the slippage has taken place, the wicket gate is not free to rotate or flutter but is held in the slipped position.

PATENTED SEP 28 1971 3,608,860

Inventor
John W. Korn
By John C. Hines
Attorneys

WICKET-GATE-RESTRAINING DEVICE

This invention pertains in general to hydraulic turbines and pump turbine units and more particularly to the linkage for controlling the wicket gates for such turbines and pump turbine units.

Hydraulic turbines of the Francis and propeller types are provided with a series of revolvable wicket gates arranged around the impeller runner to control and guide the water flow through the turbine and against the runner, thereby spinning the runner to generate power. Each wicket gate is provided with a lever arm attached thereto which is rotated either by an individual servo motor or a control ring which simultaneously actuates all gates and positions them to control the power output of the turbine.

At times, debris may enter the turbine intake and be carried to the wicket gate and thereby block the movement of the wicket gate. If the control linkage is activated when a wicket gage is blocked, the linkage may be damaged, necessitating extensive repair and downtime for the turbine. It is therefore the practice, to avoid damage and possible destruction of the control linkage, to provide a shear pin in the control linkage to release the wicket gate from the linkage when a predetermined stress has been exceeded. As a gate released from its linkage is free to rotate or flutter, stops have been provided to limit such rotation thereby preventing interference and damage to the neighboring gate.

It has been found that the water force acting upon a gate free from its control linkage will cause the gate to vibrate and flutter, sometimes slamming the gate against the stops. The resulting momentum of the gate which is a product of rotational velocity times the large mass comprising the gates is at times of such extreme magnitude that the stops are either bent over and wedged under the gate or broken off completely. In some cases where larger stops have been utilized, the momentum has caused the main shaft of the wicket gate to be twisted out of shape.

U.S. Pat. No. 3,060,706, issued to Paul D. Hess on Oct. 30, 1962 and assigned to the same assignee as this invention, protects the wicket gate and the control linkage by prohibiting the gate from fluttering after it is removed from the control of the control linkage. In that patent a shear pin is provided which limits the amount of torque that can be transmitted. Once this torque has been exceeded, the shear pin fractures and a motion dampening device prohibits the gate from fluttering. Although the device of the above-identified patent does overcome the problem referred to above, the device is reasonably expensive. It is, therefore, the intention and general object of this invention to provide an inexpensive connection for hydraulic turbine wicket gates which permits relative movement between the control linkage and the wicket gate when a predetermined torque is exceeded, however, which prohibits the gate from fluttering after this relative movement has taken place.

A further object of the subject invention is to provide a frictional connection between the wicket gate and the control linkage.

A more specific object of the subject invention is to provide a frictional drive material between the wicket gate shaft and operating lever These and other objects of the subject invention will become more fully apparent as the following description is read in light of the attached drawing wherein.

Figure 1:
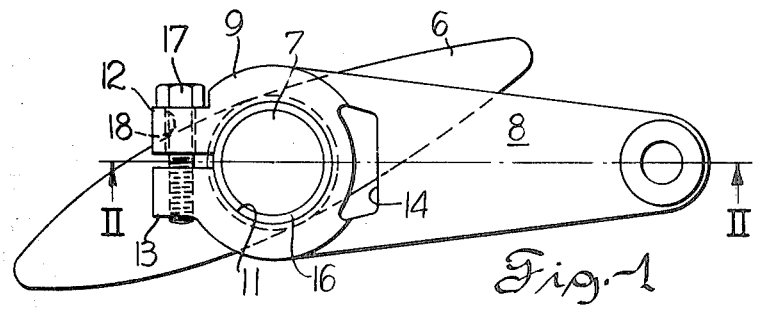
FIG. 1 is a plan view of a wicket gate and actuating lever connected together in accordance with the invention.
Figure 3:
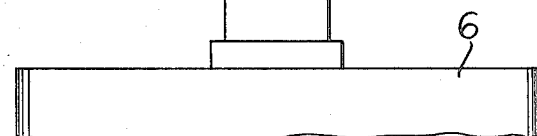
Figure 3:
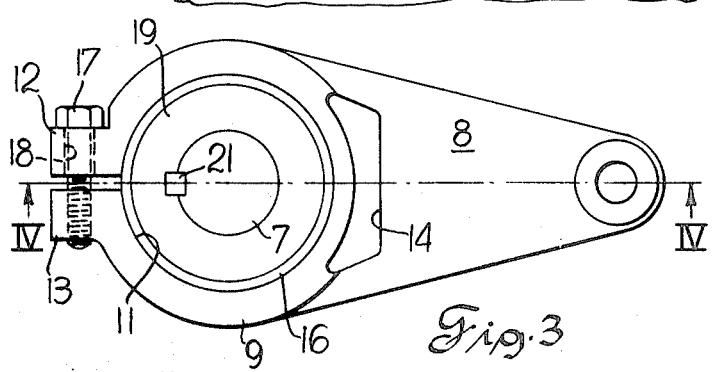
Figure 4:
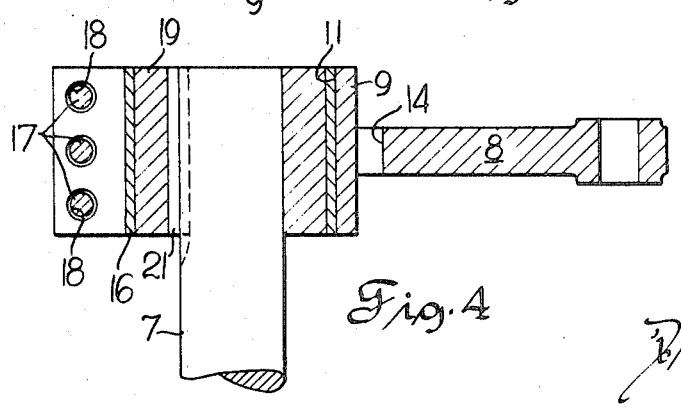

FIG. 3 is a plan view similar to FIG. 1 of a modified connection between the wicket gate and actuating lever; and FIG. 4 is a cross section taken along the line IV—IV of FIG. 3. Referring to the drawing wherein like reference characters indicate the same or similar elements, the wicket gate is designated 6. Connected to one end of the wicket gate 6 and extending longitudinally therefrom is a shaft 7. The shaft may be connected to the wicket gate in any conventional manner, such as by welding to prohibit relative motion therebetween. As is well known in the art, the wicket gate 6 is connected to the turbine housing (not shown) in any conventional manner to permit the wicket gate to rotate relative to the housing.

A gate-actuating lever generally designated 8 is positioned about the free end of shaft 7. The gate-actuating lever 8 is provided with a hub 9 at one end thereof having a bore 11 therethrough. The hub 9 is split at one end as best shown in Figs. 1 and 3. Shoulders 12 and 13 are provided on the outer surface of the hub on each side of the split end. An opening 14 may be provided through the lever and hub to increase the flexibility of the split portion of the hub.

Figure 2:
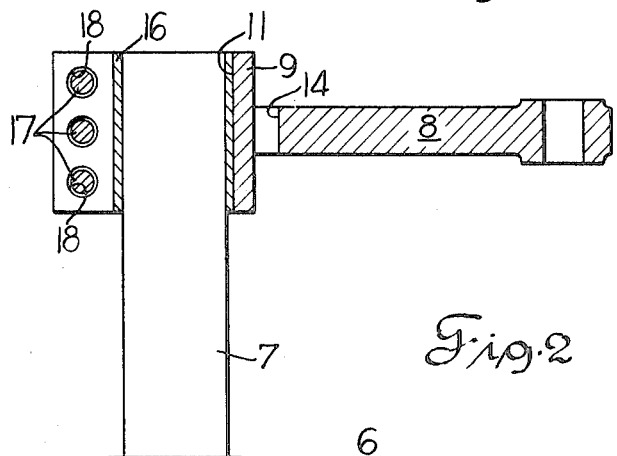
FIG. 2 is a cross section taken along the line II—II of FIG. 1.

As shown in Figs. 1 and 2, the lever interior surface is provided with a frictional material 16. It should be understood that this frictional material may be provided about the shaft rather than the bore of the hub 9. This frictional material may be of any conventional type, such as that utilized in brake lining or clutch facings. The lever 8 is positioned about the shaft 7 so that the frictional material 16 encircles the shaft. Bolts 17 are then inserted through the bores 18 provided through the shoulder 12 and are held by the internal threads in shoulder 13 on the hub 9. The lever 8 is then rotated relative to the shaft 7 to the required position. The bolts then are tightened down with sufficient torque to create a frictional engagement between the shaft and the lever through the friction material.

If the surface area of the frictional material, when combined with the radius of its surface, is not sufficient to withstand the torque which must be transmitted, a sleeve 19 (Figs. 3 and 4) may be provided about the shaft 7. The sleeve may be connected to the shaft in any conventional manner, such as by the shaft key 21. With the sleeve 19 attached to the shaft, the bore 11 of the hub 9 is larger and more surface area of frictional material 16 at a larger radius is available to transmit the torque.

From the above description, it can be seen that a very inexpensive arrangement to overcome the problem of wicket gate control linkage breakage has been described. Furthermore, because of the frictional engagement between the actuating lever and the wicket gate shaft, a shear pin to protect the operating linkage is no longer necessary.

The embodiments of the invention in which an exclusive property or privilege is claimed are defined as follows:

1. A gate-operating mechanism for a hydraulic machine comprising: a wicket gate having a shaft connected thereto for rotation therewith; an operating lever having a bore therethrough positioned about said shaft; and a frictional sleeve positioned about said shaft and clamped between said shaft and said lever with sufficient force to transmit a predetermined torque slippage takes place.

2. The gate-restraining mechanism set forth in claim 1 and further comprising a spacer cylinder positioned about said shaft and rigidly connected thereto, said frictional sleeve being positioned about said cylinder.

3. The gate operating mechanism set forth in claim 1 wherein said operating lever is provided with a split end open to said bore and further comprising means connecting said split ends and clamping said frictional sleeve between said lever bore and said shaft.